F. L. BENEDICT.
ATTACHMENT FOR COOKING PANS.
APPLICATION FILED DEC. 3, 1908.
937,574.
Patented Oct. 19, 1909.
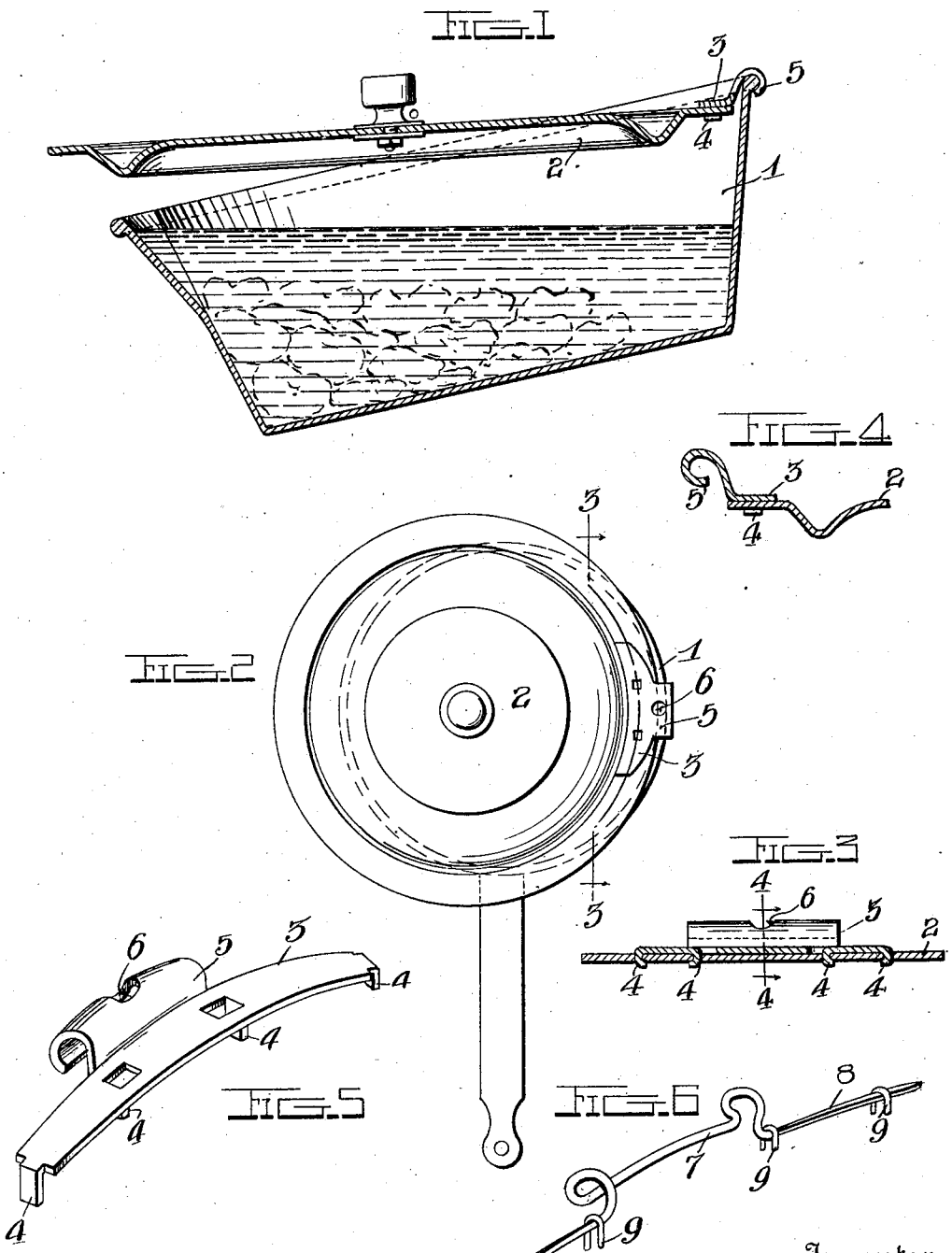

UNITED STATES PATENT OFFICE.

FRED LEE BENEDICT, OF JERSEY CITY, NEW JERSEY, ASSIGNOR OF ONE-HALF TO HENRY JONES, OF JERSEY CITY, NEW JERSEY.

ATTACHMENT FOR COOKING-PANS.

937,574.  Specification of Letters Patent.  Patented Oct. 19, 1909.

Application filed December 3, 1908. Serial No. 465,858.

*To all whom it may concern:*

Be it known that I, FRED LEE BENEDICT, a citizen of the United States, residing at Jersey City, in the county of Hudson and State of New Jersey, have invented certain new and useful Improvements in Attachments for Cooking-Pans; and I do declare the following to be a full, clear, and exact description of the invention, such as will enable others skilled in the art to which it appertains to make and use the same.

This invention relates to improved means for detachably connecting a cover or lid to a cooking or other pan in position on the body of the pan to permit the liquid contents of the pan to be poured out and the solid contents thereof retained.

One of the objects of the invention is to provide a simple device attached to the cover and capable of being readily connected with a pan to hold said cover or lid on the pan with one edge thereof arranged inside the pan adjacent the inner face of one side wall and with its other edge projecting over the opposite edge of the pan to enable the liquid contents thereof to be readily poured out without permitting the solid contents to pass with it.

With these and other objects in view the invention consists of certain novel features of construction, combination and arrangement of parts, as will be more fully described and particularly pointed out in the appended claims.

In the accompanying drawings, Figure 1 is a vertical section of a pan with this improved device applied; Fig. 2 is a top plan view thereof. Fig. 3 is a vertical longitudinal sectional view showing the manner in which the attachment is secured to the lid taken on line 3—3 of Fig. 2. Fig. 4 is a detail cross sectional view, Fig. 5 is a detail perspective view of the device attached, Fig. 6 is a detail perspective view of a modification.

In the accompanying drawings a pan 1 is shown having a separate cover or lid 2 therefor. A cover-engaging member is mounted on the lid 2 near one edge thereof and as shown in Figs. 1 to 5 comprises a plate 3 formed with prongs 4 which are preferably struck out therefrom and are adapted to be extended through the lid 2 and clamped against the under side thereof. The plate 3 is provided with an upstanding offset hook 5 which is preferably formed with an opening 6 adapted to receive a nail for hanging up the lid when not in use. This hook 5 is arranged at the outer edge of the plate 3 and the plate is mounted near one edge of the lid.

When it is desired to apply a lid provided with my attachment the offset hook member 5 is hooked over the rim 1ª of the pan 1 thereby bringing the outer edge of the cover at the point where said hook is secured thereto within the pan 1 adjacent the inner face of the upper portion of its side wall thereby causing its opposite edge to project over and beyond the opposite side of the pan and when pressure is applied to the cover or lid to force it downward the opposite side of the lid will be held against the upper edge of the opposite side of the pan. When so held the cover 2 projects slightly beyond the pan 1 to allow sufficient space for the passage of the liquid contents thereof but not enough to permit the passage of the solid material contained therein. When not in use the cover or lid may be suspended by passing the opening 6 of hook 5 over a suitable nail or other device.

In Fig. 6 is illustrated a modification of the attachment composed of stiff wire and bent to form an offset rim-engaging hook 7 which is formed on two arms 8 extending laterally in opposite directions said arms being adapted to be secured to a cover or lid by means of staples as 9. The form shown in Fig. 6 is applied in exactly the same way as the attachment shown in the other figures and should it be desired the pointed ends of the arms 8 may be passed through the cover and bent against the under side thereof to securely hold the same in position thereon.

From the foregoing description taken in connection with the accompanying drawings, the construction and operation of the invention will be readily understood without requiring a more extended explanation.

Various changes in the form proportion and the minor details of construction may be resorted to without departing from the principle or sacrificing any of the advantages of this invention as defined in the appended claims.

What I claim as my invention is:

1. A device for hingedly and detachably connecting a cover to a vessel comprising a cover engaging member adapted for connection near the edge of a cover, a hook-like vessel-engaging member fixed to and extending upwardly from the outer edge of said cover member and arranged to extend beyond the edge of the cover when applied, said vessel engaging member being curved downwardly and inwardly to connect the cover with the vessel to support said cover with one edge in engagement with the inner face of the side wall of the vessel.

2. A lid or cover securing device comprising a member for connection to the cover, a rigid upstanding offset hook projecting beyond the outer edge of said member and above its upper surface for detachably engaging the rim of a vessel.

3. A device of the class described a plate having prongs for engagement with a vessel lid and an upwardly-extending off-set hook fixed to the outer edge thereof and adapted to project beyond the outer edge of said plate and the edge of the lid to hold the edge of the lid in engagement with the inner face of the side wall of the vessel when applied.

In testimony whereof I have hereunto set my hand in presence of two subscribing witnesses.

FRED LEE BENEDICT.

Witnesses:
 MATTHEW HIGGINS,
 WM. A. HIGGINS.